(12) United States Patent
Wu et al.

(10) Patent No.: US 12,379,610 B2
(45) Date of Patent: Aug. 5, 2025

(54) ORTHOKERATOLOGY LENS USING ASPHERIC E-VALUE TO CONTROL TEAR HEIGHT TO SLOW DOWN THE GROWTH RATE OF THE EYEBALL

(71) Applicant: BRIGHTEN OPTIX CORP., Taipei (TW)

(72) Inventors: I-Tsung Wu, Taipei (TW); Wen-Pin Lin, Taipei (TW); Wen-Kai Li, Taipei (TW)

(73) Assignee: BRIGHTEN OPTIX CORP., Taipei (TW)

( * ) Notice: Subject to any disclaimer, the term of this patent is extended or adjusted under 35 U.S.C. 154(b) by 562 days.

(21) Appl. No.: 17/829,999

(22) Filed: Jun. 1, 2022

(65) Prior Publication Data

US 2022/0291524 A1 Sep. 15, 2022

Related U.S. Application Data

(63) Continuation-in-part of application No. 17/707,131, filed on Mar. 29, 2022, now Pat. No. 12,197,046, and
(Continued)

(30) Foreign Application Priority Data

Nov. 17, 2017 (TW) .................................. 106217150

(51) Int. Cl.
*G02C 7/04* (2006.01)
*G02C 7/06* (2006.01)
(52) U.S. Cl.
CPC ............. *G02C 7/047* (2013.01); *G02C 7/041* (2013.01); *G02C 7/061* (2013.01); *G02C 2202/12* (2013.01); *G02C 2202/24* (2013.01)

(58) Field of Classification Search
None
See application file for complete search history.

(56) References Cited

U.S. PATENT DOCUMENTS 5,044,742 A * 9/1991 Cohen .................... G02C 7/047
351/159.48
8,201,941 B2 6/2012 Choo et al.
(Continued)

OTHER PUBLICATIONS

Strang, Gilbert. Calculus vol. 1. OpenStax, Mar. 30, 2016 (Year: 2016).*
(Continued)

*Primary Examiner* — Marin Pichler
*Assistant Examiner* — Justin W. Hustoft
(74) *Attorney, Agent, or Firm* — MUNCY, GEISSLER, OLDS & LOWE, P.C.

(57) ABSTRACT

Orthokeratology lens that uses aspheric E value to control tear height to sloe down the growth rate of the eyeball. The lens includes treat treatment zone through which light passes to image at retina of eyeball and positioning zone of non-visual area outside treatment zone. The treatment zone includes base curve and reverse curve formed on outside of base curve. The positioning zone includes alignment curve and peripheral curve located outside alignment curve. Center point is formed in center of base curve, junction of base curve and reverse curve forms first point of intersection, junction of reverse curve and alignment curve forms second point of intersection, and junction of alignment curve and peripheral curve forms third point of intersection. Linear distance between center point and cornea of preset eyeball is between 9 μm and 21 μm. Linear distance between first point of intersection and cornea of preset eyeball is between 89 μm and 189 μm.

5 Claims, 5 Drawing Sheets

Related U.S. Application Data a continuation-in-part of application No. 16/707,519, filed on Dec. 9, 2019, now Pat. No. 11,378,820, said application No. 17/707,131 is a continuation-in-part of application No. 16/707,519, filed on Dec. 9, 2019, now Pat. No. 11,378,820, which is a continuation of application No. 16/158,833, filed on Oct. 12, 2018, now abandoned.

(56) References Cited

U.S. PATENT DOCUMENTS

| | | |
|---|---|---|
| 8,950,859 B2 | 2/2015 | Tung |
| 10,001,660 B1 | 6/2018 | Chow |
| 2002/0159025 A1* | 10/2002 | Legerton ............... G02C 7/047 351/159.1 |
| 2007/0159601 A1* | 7/2007 | Ho ........................ G02C 7/02 351/221 |
| 2008/0212021 A1 | 9/2008 | Berke |
| 2012/0113386 A1 | 5/2012 | Back |
| 2015/0124212 A1* | 5/2015 | Loertscher ............ G02C 7/047 351/159.02 |
| 2016/0239634 A1 | 8/2016 | Yen et al. |
| 2017/0010479 A1 | 1/2017 | Meyers |

OTHER PUBLICATIONS

Shen, Jie, et al. "Peripheral refraction with and without contact lens correction." Optometry and Vision Science 87.9 (2010): 642-655 (Year: 2010).*

* cited by examiner

Use a corneal inspection machine to obtain the shape of the cornea of the wearer's eyeball, so as to know the amount of tear required for the shape of the cornea to create peripheral defocusing. —A Use an electronic device to simulate wearing the preset orthokeratology lens on the cornea, and calculate the tear volume between the cornea and the base curve and reverse curve of the preset orthokeratology lens. —B Perform a calibration operation on the preset orthokeratology lens. The calibration operation is to adjust the eccentricity of the base curve of the preset orthokeratology lens so that the eccentricity of the base curve is non-zero, so that the base curve of the preset orthokeratology lens is aspherical. In this way, the eccentricity of the base curve can be adjusted to make the tear volume between the preset orthokeratology lens and the cornea conform to the tear volume required for the shape of the cornea to create peripheral defocusing. —C Use a lens manufacturing machine to produce the lens of the present invention according to the preset orthokeratology lens. —D

*FIG. 4*

ORTHOKERATOLOGY LENS USING ASPHERIC E-VALUE TO CONTROL TEAR HEIGHT TO SLOW DOWN THE GROWTH RATE OF THE EYEBALL

CROSS REFERENCE TO THE RELATED APPLICATIONS

This application is a Continuation-In-Part of application Ser. No. 17/707,131, filed on Mar. 29, 2022; which is a Continuation-In-Part of application Ser. No. 16/707,519, filed on Dec. 9, 2019; which is a Continuation of application Ser. No. 16/158,833, filed on Oct. 12, 2018; this application is also a Continuation-In-Part of application Ser. No. 16/707,519, filed on Dec. 9, 2019; which is a Continuation of application Ser. No. 16/158,833 filed on Oct. 12, 2018; for which priority is claimed under 35 U.S.C. § 120, the entire contents of all of which are hereby incorporated by reference.

This application claims the priority benefit of Application No. 106217150 filed in Taiwan on Nov. 17, 2017.

BACKGROUND OF THE INVENTION

1. Field of the Invention

The present invention relates to an orthokeratology lens that use aspheric E-value to control tear height to slow down the growth rate of the eyeball, especially the treatment zone of the lens using a base curve with an eccentricity between −4 and 4 to make the eccentricity of the image shell on the retina is non-zero, to increase the peripheral defocus area of the image on the retina, thereby effectively controlling myopia or hyperopia.

2. Description of the Related Art

At present, the main methods of correcting refractive errors include wearing glasses, contact lenses, corneal myopia surgery or orthokeratology lenses. Each of the above methods has its advantages and disadvantages. Here, it is especially focus on orthokeratology lenses, where the orthokeratology lenses are made of high oxygen permeable rigid gas materials. When the lens is worn on the eyeball, a layer of unevenly distributed tear will be sandwiched between the lens and the outer surface of the cornea of the eyeball, and the epithelial cells can be squashed by the positive pressure exerted by the tear on the cornea. At the same time, if the wearer closes the eye, it will exert a certain pressure on the cornea by the weight of the eyelid and lens. If the wearing time is sufficient, the central curvature of the cornea can be gradually flattened and the central epithelial layer gradually thinned, so that the central cornea can be flattened, thereby reducing the refractive power of the cornea. In this way, the effect of correcting myopia and even returning to normal vision is achieved.

However, although general orthokeratology lenses can correct myopia, some people cannot effectively control the progression of myopia by wearing orthokeratology lenses, so that the power of myopia will continue to increase. Moreover, when the target power of the orthokeratology lens is low (between about −0.50 and −4.00 D), since the base curve of the orthokeratology lens is spherical, the space formed by the spherical base curve and the reverse curve on one side for the accumulation of tears will be insufficient, so that epithelial cells cannot be effectively squeezed, resulting in poor myopia control. How to solve the current problems and problems of wearing orthokeratology lenses is the direction that correlated industry in this field want to study and improve.

SUMMARY OF THE INVENTION

The present invention has been accomplished under the circumstances in view. It is therefore the main object of the present invention to provide an orthokeratology lens that uses aspheric E-value to control tear height to slow down the growth rate of the eyeball, wherein the aspheric lens is an orthokeratology lens to be worn on the cornea surface of a preset eyeball. The surface of the orthokeratology lens is aspheric. The orthokeratology lens comprises a treatment zone through which light passes to image at the retina of the eyeball, and a positioning zone of the non-visual area outside the treatment zone. The treatment zone comprises a base curve, and a reverse curve formed on the outside of the base curve. The positioning zone comprises an alignment curve, and a peripheral curve located outside the alignment curve. The aspheric lens is provided with the alignment curve and the peripheral curve of the positioning zone from the outer side of the base curve and the reverse curve of the treatment zone to the outside in sequence. A center point is formed in the center of the base curve. The junction of the base curve and the reverse curve forms a first point of intersection. The junction of the reverse curve and the alignment curve forms a second point of intersection. The junction of the alignment curve and the peripheral curve forms a third point of intersection. The linear distance between the center point of the base curve and the cornea of the preset eyeball is between 9 μm and 21 μm. The linear distance between the first point of intersection and the cornea of the preset eyeball is between 89 μm and 189 μm. An electronic device is used to simulate wearing the orthokeratology lens on the cornea, and a calculation formula is used to calculate the tear volume between the cornea and the base curve and reverse curve of the preset orthokeratology lens. The calculation formula is tear volume=$\int_0^{BCW/2} f1(x)\,dx + \int_{BCW/2}^{(BCW+RCW)/2} f2(x)\,dx$. In this way, it effectively controls myopia or hyperopia, to achieve the purpose of correcting myopia or hyperopia.

Another object of the present invention is that the eccentricity of the base curve of the aspheric lens is between −4 and 4, and the eccentricity of the image shell of the image on the retina of the preset eyeball is non-zero. The reverse curve of the aspheric lens is aspherical. The linear distance between the second point of intersection between the reverse curve and the alignment curve and the cornea of the preset eyeball is between 15 μm and 25 μm. The third point of intersection between the alignment curve and the peripheral curve of the aspheric lens is in contact with the cornea surface of the preset eyeball.

Another object of the present invention is that the lens can be simulated on the cornea to be worn with the lens through an electronic device, and the calculation formula is used to calculate the tear volume between the base curve and the reverse curve of the cornea and the lens. Then adjust the eccentricity of the orthokeratology lens base curve to make the base curve aspherical, so that the tear volume between the orthokeratology lens and the cornea conforms to the tear volume required by the cornea shape to create peripheral defocusing. With this manufacturing method, the tear volume between the lens and the cornea can be easily matched to the required tear volume, to reduce manufacturing errors and achieve the purpose of improving product yield.

BRIEF DESCRIPTION OF THE DRAWINGS

FIG. 4 is a flowchart of the present invention.

DETAILED DESCRIPTION OF THE PREFERRED EMBODIMENT

Figure 1:
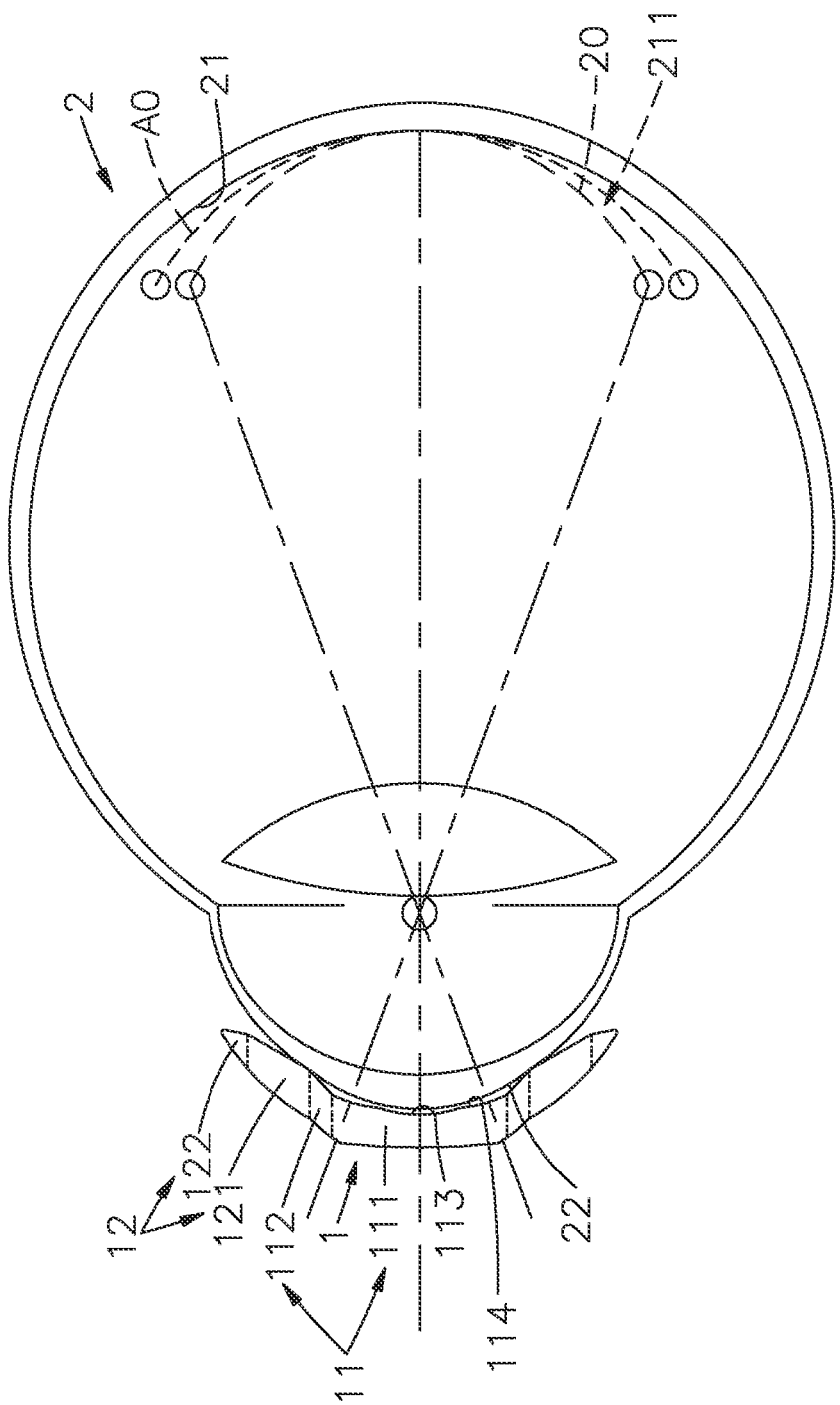
FIG. 1 is a schematic diagram of the light path of the present invention.
Figure 2:
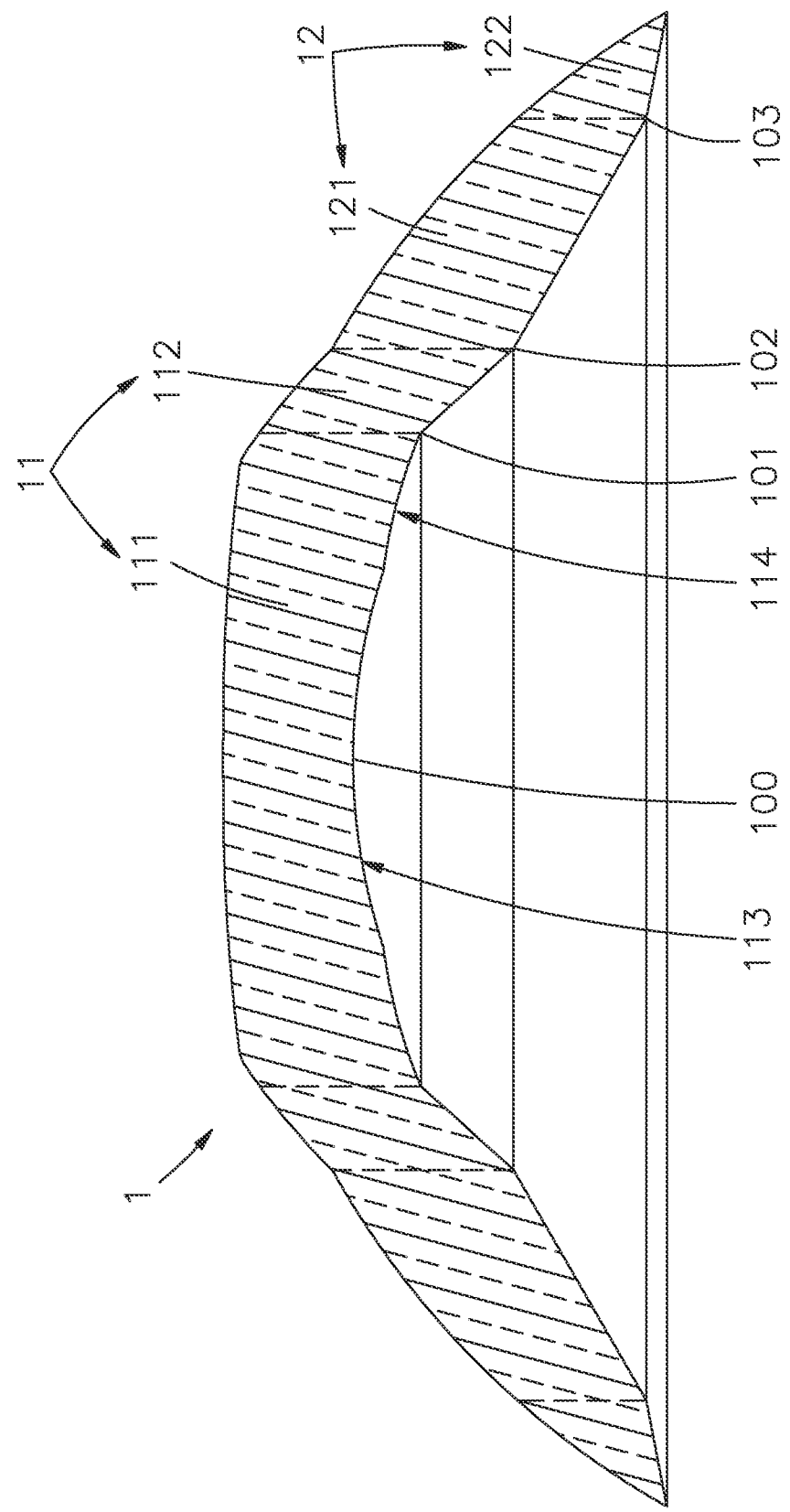
FIG. 2 is a cross-sectional side view of the present invention.
Figure 3:
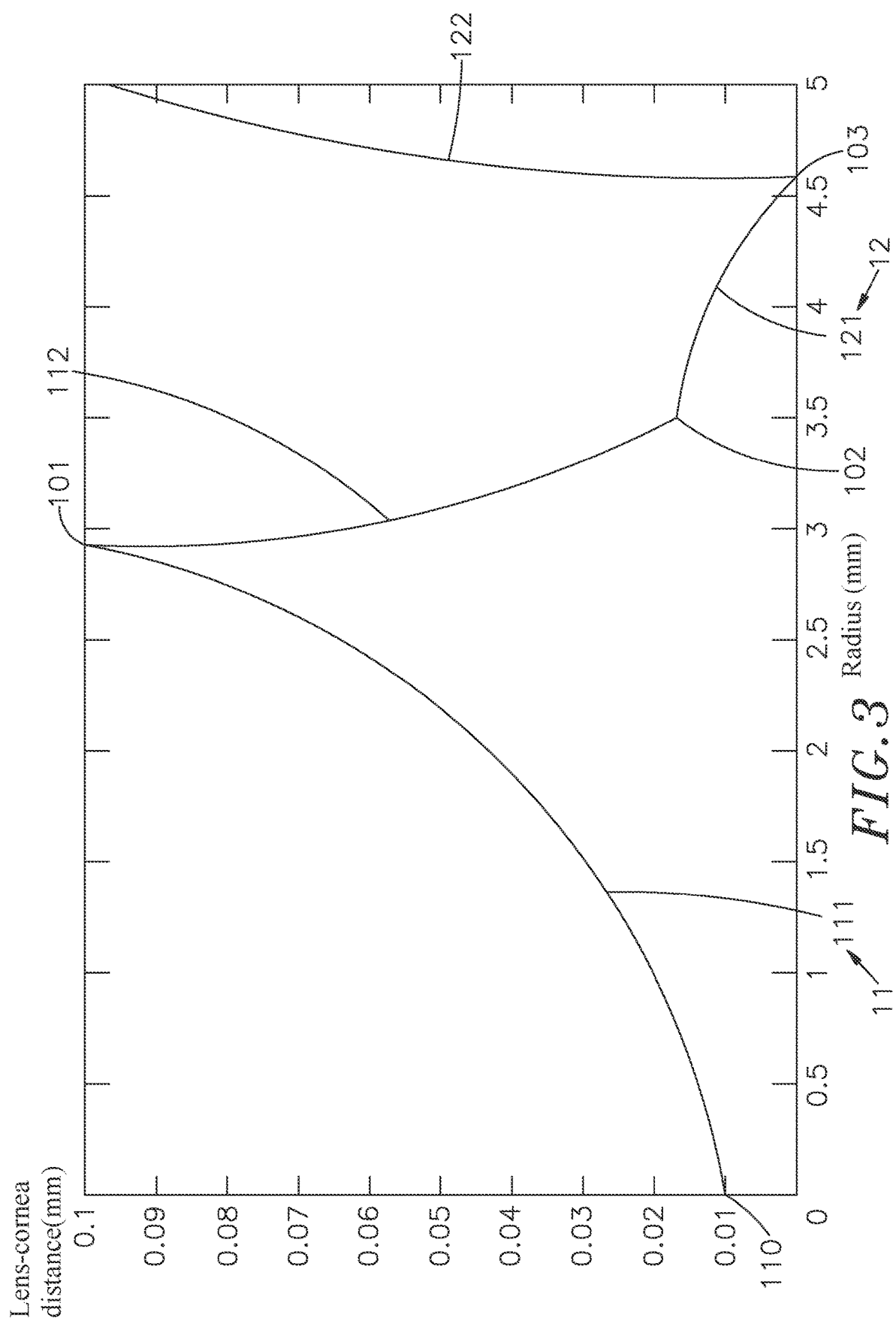
FIG. 3 is a data diagram of the distance between the lens of the present invention and the cornea.

Referring to FIGS. 1, 2 and 3, as shown in the drawings, it can be clearly seen that the orthokeratology lens of the present invention uses aspheric E-value to control tear height to slow down the growth rate of the eyeball. The lens 1 is an orthokeratology lens and the surface is aspheric. The lens 1 comprises a treatment zone 11 through which light passes to image at the retina 21 of the eyeball 2, and a positioning zone 12 of the non-visual area outside the treatment zone 11.

The treatment zone 11 comprises a base curve 111 (BC) whose eccentricity (E-value) can be between −4 and 4, and a reverse curve 112 (RC) formed on the outside of the base curve 111 to form a gap between the base curve 111 and the eyeball 2 for the accumulation of tears.

The positioning zone 12 comprises an alignment curve 121 that allows the lens 1 to be firmly fixed on the eyeball 2, and a peripheral curve 122 (PC) located outside the alignment curve 121.

The base curve 111 eccentricity of the treatment zone 11 of the lens 1 can be between −4 and 4, and when the eccentricity is between 0 and 1, the surface of the base curve 111 has an elliptical shape.

The above-mentioned lens 1 is provided with the alignment curve 121 and the peripheral curve 122 of the positioning zone 12 from the outer side of the base curve 111 and the reverse curve 112 of the treatment zone 11 to the outside in sequence. A center point 100 is formed in the center of the base curve 111. The junction of the base curve 111 and the reverse curve 112 forms a first point of intersection 101, the junction of the reverse curve 112 and the alignment curve 121 forms a second point of intersection 102, and the junction of the alignment curve 121 and the peripheral curve 122 forms a third point of intersection 103. The linear distance between the center point 100 of the base curve 111 and the cornea of the preset eyeball is between 9 μm~21 μm. The linear distance between the first point of intersection 101 at the junction of the base curve 111 and the reverse curve 112 and the cornea 22 of the preset eyeball 2 is between 89 μm and 189 μm. This way effectively controls myopia or hyperopia, to achieve the purpose of correcting myopia or hyperopia.

The eccentricity of the base curve 111 of the treatment zone 11 of the aforementioned lens 1 can be between −4 and 4, and the eccentricity of the image shell imaged on the retina 21 of the preset eyeball 2 is non-zero. The reverse curve 112 of the treatment zone 11 of the lens 1 is aspherical, and the linear distance between the second point of intersection 102 between the reverse curve 112 and the alignment curve 121 of the positioning zone 12 and the cornea 22 of the preset eyeball 2 can be between 15 μm and 25 μm. As for the third point of intersection 103 between the alignment curve 121 and the peripheral curve 122 of the positioning zone 12 of the lens 1 is in contact with the surface of the cornea 22 of the preset eyeball 2.

The linear distance between the second point of intersection 102 between the reverse curve 112 of the treatment zone 11 and the alignment curve 121 of the positioning zone 12 of the lens 1 and the cornea 22 of the eyeball 2 is between 15 μm and 25 μm. Since the base curve 111 and the reverse curve 112 of the lens 1 are aspherical, the aspherical design can be used to ensure that the linear distance between the second point of intersection 102 and the cornea 22 of the eyeball 2 is between 15 μm and 25 μm, which can improve the accuracy of manufacturing. Because the base curve 111 of the lens 1 is aspherical (eccentricity is non-zero), the eccentricity of the image shell 20 imaged on the retina 21 of the eyeball 2 can be made non-zero, to increase the peripheral defocus area of the image on the retina 21, and then effectively control the speed of eye axial length change (lengthening or shortening), thereby effectively controlling myopia or hyperopia, thereby achieving the effect of correcting myopia or hyperopia.

Furthermore, the third point of intersection 103 between the alignment curve 121 and the peripheral curve 122 of the positioning zone 12 of the lens 1 is in contact with the surface of the cornea 22 of the eyeball 2. Because the lens 1 is arc-shaped, the closer the lens 1 is to the outer periphery, the larger the circumference, so that when the third point of intersection 103 contacts the surface of the cornea 22 of the eyeball 2, the contact part is the most, so that when the eyelid is closed on the lens 1, the lens 1 is not prone to shaking, which can reduce the offset of the lens 1, thereby improving the accuracy of squeezing, to surely squeeze the surface of the cornea 22.

Furthermore, the preset curve of the base curve 111 of the treatment zone 11 of the lens 1 is greater than the horizontal curve of the cornea 22 of the eyeball 2 (that is, the curve of the base curve 111 is flatter than the horizontal curve of the cornea 22). Since the curve of the base curve 111 is greater than the curve of the cornea 22, when the lens 1 is worn on the eyeball 2, the tear between the base curve 111 and the cornea 22 can generate a positive pressure on the epithelial cells of the cornea 22. In addition, the reverse curve 112 of the lens 1 can store tears, and the negative pressure provided by the tears can achieve the effect of improving the positioning of the lens 1 on the eyeball 2.

The peripheral curve 122 of the positioning zone 12 of the lens 1 preferably has a slightly raised edge design. It can squeeze the tears during blinking to promote the tear circulation inside the lens 1, and the tear circulation can make the lens 1 and the cornea 22 of the eyeball 2 continue to lubricate and bring in oxygen, to improve the comfort of wearing and wearability.

In addition, an electronic device is used to simulate wearing the above-mentioned lens 1 on the cornea 22, and a calculation formula is used to calculate the amount of tears between the cornea 22 and the base curve 111 and reverse curve 112 of the lens 1. The formula is tear volume=$\int_{0}^{BCW/2} f1(x)dx + \int_{BCW/2}^{(BCW+RCW)/2} f2(x)dx$.

When the present invention is used, the user can first put the lens 1 on the eyeball 2 and make the inner surface of the lens 1 contact the surface of the cornea 22 of the eyeball 2. At this time, tears with uneven thickness will be generated between the inner surface of the lens 1 and the cornea 22. When the user blinks or goes to bed at night to close the eyelid (not shown in the drawing), the eyelid will press against the outer surface of the lens 1, and at the same time, the weight of the eyelid and the lens 1 will generate a positive pressure. The tear between the base curve 111 of the treatment zone 11 of the lens 1 and the cornea 22 exerts a positive pressure on the epithelial cells at the center of the surface of the cornea 22 of the eyeball 2. The epithelial cells on the surface of the cornea 22 are squeezed by the tear, and the central curve gradually becomes relatively flat. Thereby, the central epithelial layer of the cornea 22 is thinned, thereby reducing the refractive power of the cornea 22, so that the imaging point of the visual object is moved in the direction of the retina 21 of the eyeball 2, thereby achieving the effect of reducing the power of myopia or eliminating the power of myopia.

Please refer to FIGS. 1, 2, 3, and 4 again. It can be clearly seen from the drawings that the orthokeratology lens of the present invention uses aspheric E-value to control tear height to slow down the growth rate of the eyeball, and the lens 1 of the present invention is manufactured. It can include the following steps:

(A) Use a corneal inspection machine (not shown) to obtain the shape of the cornea 22 of the wearer's eyeball 2, so as to know the amount of tears required for the shape of the cornea 22 to create peripheral defocusing.

(B) Use an electronic device (not shown) to simulate wearing the preset orthokeratology lens (not shown) on the cornea 22 and calculate the tear volume between the cornea 22 and the base curve and reverse curve of the preset orthokeratology lens.

(C) Perform a calibration operation on the preset orthokeratology lens. The calibration operation is to adjust the eccentricity (E-value) of the base curve of the preset orthokeratology lens so that the eccentricity of the base curve is non-zero, so that the base curve of the preset orthokeratology lens is aspherical. In this way, the eccentricity of the base curve can be adjusted to make the tear volume between the preset orthokeratology lens and the cornea 22 conform to the tear volume required for the shape of the cornea 22 to create peripheral defocusing.

(D) Use a lens manufacturing machine (not shown) to produce the lens 1 of the present invention according to the preset orthokeratology lens.

The corneal inspection machine in the above step (A) is a machine for detecting the diopter, shape, or radius of curvature of the cornea 22 of the eyeball 2, such as Topography, Auto-K or any machine can inspect the Manifest refraction, Schirmer, Axial Length, or Corneal diameter, etc.

The tear volume required to create peripheral defocus in the above step (A) can be obtained through a wearing experiment (that is, subjects with different cornea 22 shapes wear the cornea orthokeratology lens used for the test to know the tear volume required to create peripheral defocusing, and then build a database to make the database contain the tear volume data required for various cornea 22 shapes to create peripheral defocus).

The electronic device of the above step (B) can be an electronic device with computing functions such as a desktop computer, a notebook computer or a tablet computer, and the electronic device can be installed with a preset cornea orthokeratology lens manufacturing software, which can be used to simulate wearing the preset orthokeratology lens on the cornea 22 and calculate the tear volume between the cornea 22 and the base curve and reverse curve of the preset orthokeratology lens. The formula can be:

$$\text{tear volume} = \int_0^{BCW/2} f1(x)dx + \int_{BCW/2}^{(BCW+RCW)/2} f2(x)\,dx$$

In the above calculation formula, BCW is the width of the base curve of the preset orthokeratology lens, RCW is the width of the reverse curve of the preset orthokeratology lens, f1(x) is the inner surface of the base curve of the preset orthokeratology lens, and f2(x) is the inner surface of the reverse curve of the preset orthokeratology lens.

When the user wants to correct myopia or hyperopia (that is, the imaging distance of the eyeball 2 is too long or too short), the lens 1 can be worn on the eyeball 2 first, so that the light can pass through the treatment zone 11 of the lens 1. When the light passes through the base curve 111 of the treatment zone 11, the eccentricity of the base curve 111 can be between −4 and 4, so that the image shell 20 imaged on the retina 21 is non-circular arc shape. The non-circular arc shape image shell 20 can increase the peripheral defocus area of the image on the retina 21 compared to the circular arc shape image shell 20, and due to the increase in the peripheral defocus area, compared to the general lens whose base curve is spherical, its myopia or hyperopia control effect is better.

Furthermore, when the above-mentioned user wants to correct myopia, the preferred eccentricity of the base curve 111 of the treatment zone 11 can be set between 0 and 1. When the light passes through the base curve 111, the eccentricity of the image shell 20 imaged on the retina 21 can be between 0 and 1, which is a non-circular arc shape (ellipse). Compared with the preset spherical image shell A0, the non-circular arc shape image shell 20 can increase the peripheral defocus area on the peripheral out-of-focus image area 211 of the retina 21, to have a better myopia control effect.

Figure 5:
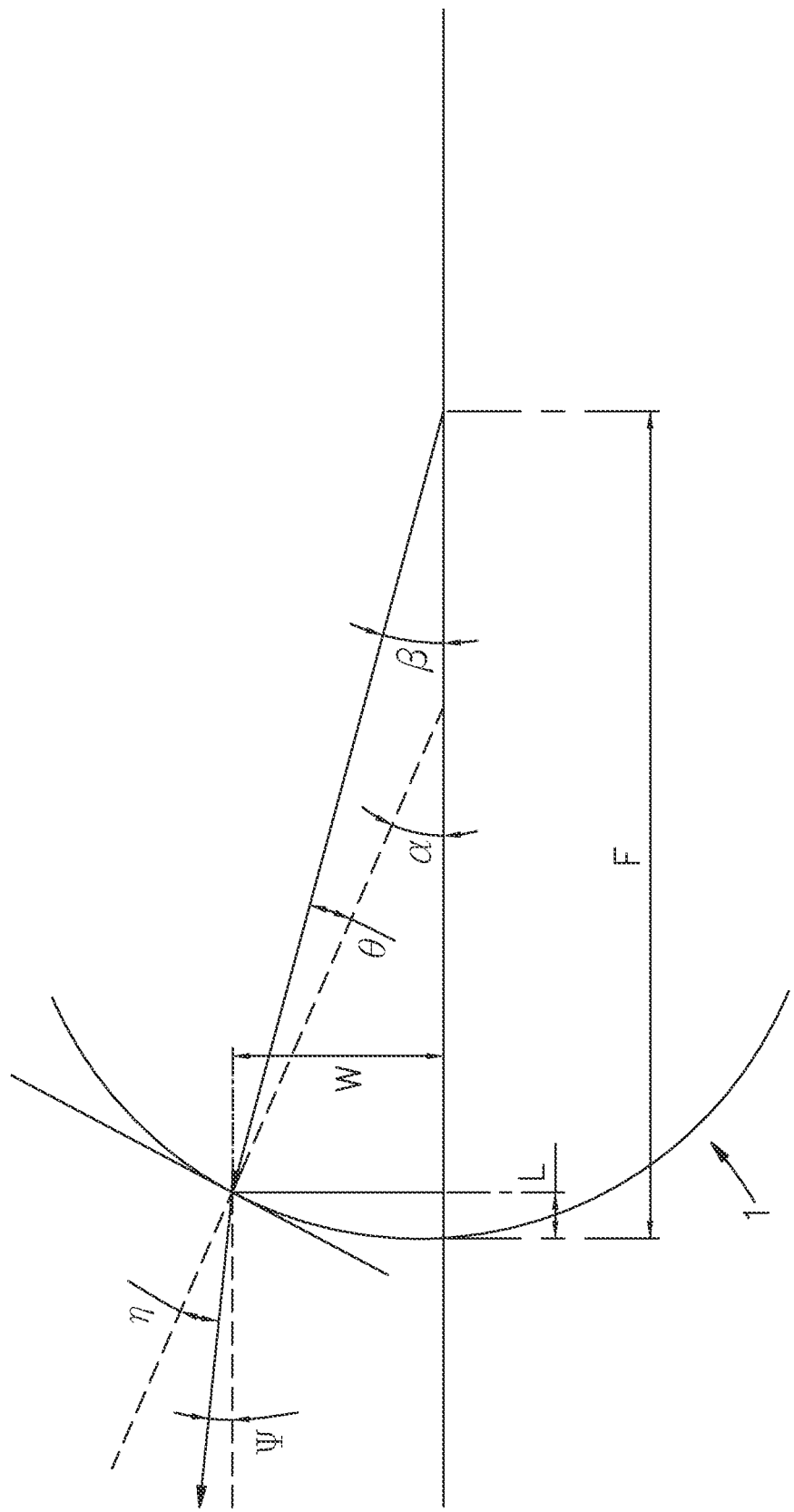
FIG. 5 is a schematic diagram of the base curve radius design of the present invention.

Also, please also refer to FIGS. 1, 2, and 5. The base curve 111 of the above-mentioned lens 1 may further comprise a first optical center inner curve 113 (BC1), a second tear height inner curve 114 (BC2), wherein the aspheric value [Ai] of the first optical center inner curve 113 (BC1) and the second tear height inner curve 114 (BC2) is:

$$BC1 - BC2 = \frac{cr^2}{1 + \sqrt{1 - (1-e^2)c^2r^2}} + \sum_{i=1}^{N} A_i P_i(x, y) = SAG''$$

the eccentricity value (e) is:

$$e^2 = 1 + \frac{-1 + \left(\frac{cr^2}{SAG'' - \sum_{i=1}^{N} A_i P_i(x, y)} - 1\right)^2}{c^2 r^2}$$

where the above (e) is the eccentricity value, and the (c) is the curvature value.

The width ratio of the first optical center inner curve 113 and the second tear height inner curve 114 of the base curve 111 of the above-mentioned lens 1 is 2:1. When the length of the second tear height inner curve 114 is 6 mm, the angle of the first optical center inner curve 113 is 1.78°, and the angle of the first optical center inner curve 113+second tear height inner curve 114 is 2.34°.

In addition, the width ratio of the first optical center inner curve 113 and the second tear height inner curve 114 of the base curve 111 of the above-mentioned lens 1 is 2:1. When the length of the second tear height inner curve 114 is 5.5 mm, the angle of the first optical center inner curve 113 is 1.657°, and the angle of the first optical center inner curve 113+second tear height inner curve 114 is 2.238°.

And the radius design method of the first optical center inner curve 113 and the second tear height inner curve 114 of the base curve 111 of the lens 1 (please also refer to FIG. 5), when the axial length between base curve 111 and retina 21 of eyeball 2=24.02 mm, the radius of base curve 111 can be 7.72 mm, (e) is the eccentricity value=0.51°, where: the (θ) is the angle of incidence with respect to the normal; the (η) is the angle of refraction relative to the normal; the (w) is the width of the first optical center inner curve 113, or the width of the first optical center inner curve 113+second tear height inner curve 114; the (Ψ) is half the width of the viewing angle.

Then, the width of the first optical center inner curve 113 and the second tear height inner curve 114 of the base curve 111 of the lens 1 can be designed in two stages. The preferred ratio is that the width ratio of first optical center inner curve 113 and the second tear height inner curve 114 is 2:1, which can increase the capacity space for storing tears between the interior of the base curve 111 and the cornea 22 of the eyeball 2, while improving the wetting of the cornea 22 of the eyeball 2 by tears. In this way, the first optical center inner curve 113 and the second tear height inner curve 114 of the base curve 111 can be tightly pressed and attached to the cornea 22, so that the retina 21 of the eyeball 2 can obtain clearer visibility and field of vision through the lens 1, and it can slow down the growth rate of the eyeball 2, and further have a good control of vision (myopia or hyperopia, etc.).

What the invention claimed is:

1. An orthokeratology lens that uses aspheric E-value to control tear height to slow down the growth rate of the eyeball, said orthokeratology lens being to be worn on a cornea surface of a preset eyeball, the surface of said orthokeratology lens being aspheric, said orthokeratology lens comprising a treatment zone through which light passes to image at a retina of said eyeball and a positioning zone of an non-visual area outside said treatment zone, said treatment zone comprising a base curve and a reverse curve formed on the outside of said base curve, said positioning zone comprising an alignment curve and a peripheral curve located outside said alignment curve, said orthokeratology lens being provided with said alignment curve and said peripheral curve of said positioning zone from the outer side of said base curve and said reverse curve of said treatment zone to the outside in sequence, a center point being formed in a center of said base curve, a junction of said base curve and said reverse curve forming a first point of intersection, a junction of said reverse curve and said alignment curve forming a second point of intersection, a junction of said alignment curve and said peripheral curve forming a third point of intersection, a linear distance between said center point of said base curve and said cornea of said preset eyeball being between 9 μm and 21 μm, a linear distance between said first point of intersection and said cornea of said preset eyeball being between 89 μm and 189 μm, an electronic device being used to simulate wearing said orthokeratology lens on said cornea, and a calculation formula being used to calculate the tear volume between said cornea and said base curve and said reverse curve of said preset orthokeratology lens, said calculation formula being:

tear volume=

$$\int_0^{BCW/2} f1(x)dx + \int_{BCW/2}^{(BCW+RCW)/2} f2(x)dx,$$

where BCW is a width of said base curve of said lens, RCW is a width of said reverse curve of said lens, f1(x) is the inner surface of said base curve of said lens, and f2(x) is the inner surface of said reverse curve of said lens, said base curve further comprising a first optical center inner curve (BC1)、a second tear height inner curve (BC2), wherein an aspheric value [Ai] of said first optical center inner curve and said second tear height inner curve is:

$$BC1 - BC2 = \frac{cr^2}{1+\sqrt{1-(1-e^2)c^2r^2}} + \sum_{i=1}^{N} A_i P_i(x,y) = SAG^H$$

an eccentricity value (e) is:

$$e^2 = 1 + \frac{-1+\left(\frac{cr^2}{SAG^H - \sum_{i=1}^{N} A_i P_i(x,y)} - 1\right)^2}{c^2 r^2},$$

wherein a width ratio of said first optical center inner curve and said second tear height inner curve of said base curve of said orthokeratology lens is 2:1, and when a length of said second tear height inner curve is 6 mm, an angle of said first optical center inner curve is 1.78°, and a sum of an angle of said first optical center inner curve and an angle of said second tear height inner curve is 2.34°.

2. The orthokeratology lens that uses aspheric E-value to control tear height to slow down the growth rate of the eyeball as claimed in claim 1, wherein an eccentricity of said base curve of said orthokeratology lens is between −4 and 4, and the eccentricity of an image shell of the image on said retina of said preset eyeball is non-zero.

3. The orthokeratology lens that uses aspheric E-value to control tear height to slow down the growth rate of the eyeball as claimed in claim 1, wherein said reverse curve of said orthokeratology lens is aspherical, and the linear distance between said second point of intersection between said reverse curve and said alignment curve and said cornea of said preset eyeball is between 15 μm and 25 μm.

4. The orthokeratology lens that uses aspheric E-value to control tear height to slow down the growth rate of the eyeball as claimed in claim 1, wherein the third point of intersection between said alignment curve and said peripheral curve of said orthokeratology lens is in contact with said cornea surface of said preset eyeball.

5. An orthokeratology lens that uses aspheric E-value to control tear height to slow down a growth rate of an eyeball, said orthokeratology lens being to be worn on a cornea surface of a preset eyeball, the surface of said orthokeratology lens being aspheric, said orthokeratology lens comprising a treatment zone through which light passes to image at a retina of said eyeball and a positioning zone of an non-visual area outside said treatment zone, said treatment zone comprising a base curve and a reverse curve formed on the outside of said base curve, said positioning zone comprising an alignment curve and a peripheral curve located outside said alignment curve, said orthokeratology lens being provided with said alignment curve and said peripheral curve of said positioning zone from the outer side of said base curve and said reverse curve of said treatment zone to the outside in sequence, a center point being formed in a center of said base curve, a junction of said base curve and said reverse curve forming a first point of intersection, a junction of said reverse curve and said alignment curve forming a second point of intersection, a junction of said alignment curve and said peripheral curve forming a third point of intersection, a linear distance between said center point of said base curve and said cornea of said preset eyeball being between 9 µm and 21 µm, a linear distance between said first point of intersection and said cornea of said preset eyeball being between 89 µm and 189 µm, an electronic device being used to simulate wearing said orthokeratology lens on said cornea, and a calculation formula being used to calculate the tear volume between said cornea and said base curve and said reverse curve of said preset orthokeratology lens, said calculation formula being: tear volume=

$$\int_0^{BCW/2} f1(x)dx + \int_{BCW/2}^{(BCW+RCW)/2} f2(x)dx,$$

where BCW is a width of said base curve of said lens, RCW is a width of said reverse curve of said lens, f1(x) is the inner surface of said base curve of said lens, and f2(x) is the inner surface of said reverse curve of said lens, said base curve further comprising a first optical center inner curve (BC1)、a second tear height inner curve (BC2), wherein an aspheric value [Ai] of said first optical center inner curve and said second tear height inner curve is:

$$BC1 - BC2 = \frac{cr^2}{1+\sqrt{1-(1-e^2)c^2r^2}} + \sum_{i=1}^{N} A_i P_i(x, y) = SAG''$$

an eccentricity value (e) is:

$$e^2 = 1 + \frac{-1+\left(\frac{cr^2}{SAG'' - \sum_{i=1}^{N} A_i P_i(x, y)} - 1\right)^2}{c^2 r^2}.$$

wherein a width ratio of said first optical center inner curve and said second tear height inner curve of said base curve of said orthokeratology lens is 2:1, and when a length of said second tear height inner curve is 5.5 mm, an angle of said first optical center inner curve is 1.657°, and a sum of an angle of said first optical center inner curve and an angle of said second tear height inner curve is 2.238°.

* * * * *